United States Patent [19]

Münzmay et al.

[11] Patent Number: 6,020,386
[45] Date of Patent: Feb. 1, 2000

[54] PROCESS FOR THE PRODUCTION OF HYDROXYFUNCTIONAL COMPOUNDS FROM (POLYURETHANE) POLYUREA WASTE

[75] Inventors: Thomas Münzmay, Dormagen; Walter Meckel, Neuss; Ulrich Liman, Monheim; Hartmut Nefzger, Pulheim; Werner Rasshofer, Köln; Karl-Heinz Dörner, Pulheim; Andreas Ruckes, Leverkusen, all of Germany

[73] Assignee: Bayer Aktiengesellschaft, Leverkusen, Germany

[21] Appl. No.: 08/189,861

[22] Filed: Feb. 1, 1994

[30] Foreign Application Priority Data

Feb. 8, 1993 [DE] Germany ............... 43 03 555
Jul. 19, 1993 [DE] Germany ............... 43 24 156

[51] Int. Cl.$^7$ ...................................... C08J 11/04
[52] U.S. Cl. .................. 521/49.5; 521/40.5; 521/49; 528/49; 528/52; 528/220; 528/224; 528/229; 528/272
[58] Field of Search ................ 521/49.5, 40.5, 521/49; 528/49, 52, 220, 224, 229, 272

[56] References Cited

U.S. PATENT DOCUMENTS 4,159,972   7/1979   Brasion et al. ................ 521/164
4,218,543   8/1980   Weber et al. ................... 521/51

OTHER PUBLICATIONS

B. Naber: "Recycling von Polyurethanen (PUR)", Kunststoffrecycling–Tagung der TU Berline Jan. 10, 1991).

W. Thoma and H. Genth Medizin und Chemie 7, 793–801 (1963), Verlag Chemie, Weinheim a.d. Bergstrasse.

H. Glaser in Houben–Weyl, Methoden der Organischen Chemie, Nov., Stuttgart (1957.

*Primary Examiner*—Duc Truong
*Attorney, Agent, or Firm*—Joseph C. Gil; Lyndanne M. Whalen

[57] ABSTRACT

Hydroxyfunctional compounds suitable for use in the polyisocyanate polyaddition process are obtained from polyurethane and/or polyurethane polyurea waste by decomposition with an alcohol and subsequent reaction of the alcoholysis products to reduce their content of low molecular weight, sterically unhindered aromatic amines. In this process, polyurethane and/or polyurethane polyurea waste is first treated with a low molecular weight diol or polyol at a temperature of from about 160 to 260° C. The resultant alcoholysis product may then either be further heated at a temperature lower than that used in the first step within the ranger of from about 50 to 180° C. or reacted with a dialkyl carbonate and/or 1,3-dicarbonyl compound.

15 Claims, No Drawings

PROCESS FOR THE PRODUCTION OF HYDROXYFUNCTIONAL COMPOUNDS FROM (POLYURETHANE) POLYUREA WASTE

BACKGROUND OF THE INVENTION

This invention relates to a process for the production of hydroxyfunctional compounds from polyurethane and/or polyurethane polyurea waste by decomposition of these plastics with an alcohol and subsequent reaction of the alcoholysis products to reduce their content of low molecular weight, sterically unhindered aromatic amines.

The decomposition of plastics produced by the polyisocyanate polyaddition process using alcohols is known in principle. However, the problem with these known decomposition processes is that recovery of useful products, particularly from plastics which have been produced using polyisocyanate mixtures of the diphenyl methane series and aromatic diamine chain extending agents (i.e., polyurethane waste rich in urea groups) remains unsolved.

Glycolyzates of polyurethane or polyurethane polyurea waste containing urea groups are characterized by a relatively high content of low molecular weight, primary aromatic amines, especially sterically unhindered, primary aromatic amines (See, e.g., B. Naber: "Recycling von Polyurethanen (PUR)", Kunststoffrecycling-Tagung der TU Berlin, 01.10.1991).

In some cases, the presence of these amines adversely affects the reusability of the glycolyzates in the isocyanate polyaddition process to a considerable extent. A high content of low molecular primary aromatic amines can adversely affect the processability of the glycolyzates, for example, in reaction injection molding (RIM), due to their high reactivity. This is reflected, for example, in excessively short flow paths (i.e., complicated molds cannot be filled).

A high content of low molecular weight primary aromatic amines, especially sterically unhindered primary aromatic amines, may also disrupt synthesis of the polymer to such an extent that the products obtained show inferior properties (high glass transition temperature, low tensile strength and poor breaking elongation).

SUMMARY OF THE INVENTION

It is an object of the present invention to provide a new process for the production of hydroxyfunctional compounds from polyurethane and polyurethane polyurea waste by alcoholysis.

It is also an object of the present invention to provide a process for the production of hydroxyfunctional compounds which are free from or have a greatly reduced content of low molecular weight sterically unhindered primary aromatic amines from polyurethane and polyurethane polyurea waste.

It is another object of the present invention to provide a process for the production of hydroxyfunctional compounds suitable for use in the polyisocyanate polyaddition process from polyurethane and polyurethane polyurea waste.

It is a further object of the present invention to provide a process for recycling polyurethane and polyurethane polyurea waste into reusable hydroxyfunctional compounds.

These and other objects which will be apparent to those skilled in the art are accomplished by reacting polyurethane and/or polyurethane polyurea waste with a low molecular weight diol or polyol at a temperature of from about 160 to about 260° C. The reaction product is then either (a) further reacted with the low molecular weight diol or polyol at a temperature of from about 50 to 180° C., which temperature must be below the temperature at which the first alcoholysis was carried out or (b) reacted with a dialkyl dicarbonate and/or a 1,3-dicarbonyl compound.

DETAILED DESCRIPTION OF THE PRESENT INVENTION

The present invention relates to a process for the production of hydroxyfunctional compounds suitable for the polyisocyanate polyaddition process from polyurethane and/or polyurethane polyurea waste. In the first stage of this process, polyurethane and/or polyurethane polyurea waste is reacted with a low molecular weight (i.e., molecular weight of less than 350) diol and/or polyol at a temperature of from about 160 to about 260° C. Relatively high molecular weight (i.e., molecular weight of from 350 to 4000) polyols may optionally be included in the reaction mixture. Any water present in the reaction vessel (introduced, for example, by moist starting materials) is preferably removed by distillation during this heating phase. In a second stage, the amine-containing alcoholysis products obtained in the first stage are either (a) further reacted with the diol or polyol while stirring at temperatures of from about 50 to about 180° C., but below the alcoholysis temperature of the first stage, or (b) reacted with a dialkyl dicarbonate and/or a 1,3-dicarbonyl compound.

The alcoholysis reaction of the first stage can be carried out by any of the methods known to those skilled in the art. One of these known methods is alcoholysis with high molecular weight polyols. In this method, coarsely ground or finely comminuted polyurethane or polyurethane polyurea waste is reacted (preferably after the removal of water at a temperature of from about 60 to about 220° C.) with a high molecular weight polyol at a temperature of from about 160 to about 240° C. in a ratio by weight of waste to high molecular weight polyol of from about 2:1 to about 1:100, preferably from about 1:1 to about 1:20. Preferred high molecular weight polyols are the high molecular weight polyols known to be useful in polyurethane and polyurethane polyurea chemistry such as polyethers, polyesters, polylactones and polycarbonates having a molecular weight in the range of from about 350 to about 4,000 (preferably in the range of from about 500 to about 2,000) and functionalities of $\geq 2$.

Alcoholysis with one or more low molecular weight diols and/or polyols is another method useful in the first stage of the process of the present invention. In this method, coarsely ground or finely comminuted polyurethane or polyurethane polyurea waste is reacted (preferably after the removal of water) with a low molecular weight diol and/or polyol at a temperature of from about 160 to about 260° C. in a ratio by weight of waste to total low molecular weight diol and/or polyol of from about 10:1 to about 1:10 and preferably from about 5:1 to about 1:3.

Suitable low molecular weight diols and/or polyols include: ethylene glycol, diethylene glycol and higher condensates, 1,2-propylene glycol, dipropylene glycol and higher condensates, hexanediol, glycerol, trimethylol propane and ethoxylation and/or propoxylation products thereof with molecular weights of <350.

Excess diol and/or polyol may optionally be partially removed from the hydroxyfunctional decomposition products by distillation after the alcoholytic decomposition reaction.

Polyols having a molecular weight of >500, known to those skilled in the art of polyurethane chemistry, may also be added to the alcoholysis products before, during or after the alcoholytic decomposition reaction to establish the desired viscosity.

The alcoholysis processes described above give hydroxyfunctional compounds which still contain considerable quantities of free sterically unhindered aromatic amines, so that their use in the polyisocyanate polyaddition process is seriously restricted or even impossible.

It has now surprisingly been found that the content of troublesome amines can be reduced by using either procedure (a) or procedure (b) in the second stage of the process of the present invention to such an extent that valuable products are obtained. These products are eminently suitable for reuse as reactants for polyisocyanates in the polyisocyanate polyaddition process.

Procedure (a) does not involve the use of any other reactants. In this procedure, the alcoholysis product from the first stage is stirred for from about 2 to about 24 hours at a temperature below the alcoholysis temperature. Rearrangement reactions cause the troublesome free, sterically unhindered aromatic amines to be blocked to such an extent that those amino groups no longer adversely affect polyaddition products produced from this alcoholysis product.

The necessary after-reaction time (i.e., stirring time subsequent to completion of the first stage of the process of the present invention) is dependent upon the particular polyurethane and/or polyurethane polyurea waste being recycled and upon the alcohol or alcohols used for the alcoholysis. The reaction time may also be influenced by the after-reaction temperature. The after-reaction temperature is preferably in the range of from about 60 to about 160° C. An after-reaction temperature which is at least 20° C. and, in a particularly preferred embodiment, at least 50° C. below the alcoholysis temperature of the first stage of the process of the present invention is preferably maintained.

In procedure (b) useful in the second stage of the process of the present invention, the alcoholysis product from the first stage is further reacted with one or more dialkyl dicarbonates or one or more 1,3-dicarbonyl compounds.

The advantage of procedure (b) over procedure (a) lies in the lower reaction temperature required and the generally more homogeneous product obtained.

The reaction of dialkyl dicarbonates with amines is known. (See, for example, W. Thoma and H. Genth, Medizin und Chemie 7, 793–801 (1963), Verlag Chemie, Weinheim a.d. Bergstraβe).

The reaction of 1,3-dicarbonyl compounds, particularly acetoacetate derivatives, with amines is also known. (See, e.g., H. Glaser in Houben-Weyl, Methoden der Organischen Chemie, 11/1, Stuttgart (1957)).

However, there is nothing in the literature to suggest that this reaction could be advantageously used to reduce the content of primary aromatic amines in alcoholysis products of polyurethane or polyurethane polyurea waste to such an extent that the resulting products are eminently suitable for reuse in the polyisocyanate polyaddition process.

The reaction of the amine-containing alcoholysis products with dialkyl dicarbonates is advantageously carried out at temperatures of from about 0 to about 100° C. and preferably at temperatures below 60° C. The dialkyl carbonate is used in an amount such that an equivalent ratio of total dialkyl dicarbonate to amino groups of from about 1:3 to about 5:1 and preferably from about 1:1 to about 2:1 is obtained.

Inert solvents may optionally be used to dilute the mixture of polyurethane and/or polyurethane polyurea waste and the alcohol reaction mixture. Suitable solvents include: cyclic polyethers such as tetrahydrofuran or dioxane; dialkyl carbonates such as diethyl or dimethyl carbonate; and cyclic carbonates such as ethylene or propylene carbonate. Ethanol or methanol may be used with particular advantage as the solvent. Where a solvent is used, it will generally be necessary to remove the solvent by distillation before the hydroxyfunctional compounds are reused in the isocyanate polyaddition process.

Suitable dialkyl dicarbonates for use in the second stage of the process of the present invention include compounds corresponding to the formula:

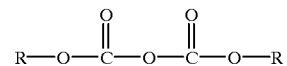

in which

R represents a linear or branched, saturated hydrocarbon radical containing from 1 to 18 carbon atoms, preferably $CH_3$ or $C_2H_5$.

The reaction of the amine-containing alcoholysis products with at least one 1,3-dicarbonyl compound is advantageously carried out at a temperature of from about 40 to about 160° C. and preferably at a temperature of from about 60 to about 140° C. The 1,3-dicarbonyl compound is used in a quantity such that an equivalent ratio of 1,3-dicarbonyl compound to amino groups of from about 1:3 to about 5:1 and preferably from about 1:1 to about 2:1 is obtained.

To complete or accelerate the reaction, it is advantageous to use a catalyst. Suitable catalysts include: proton acids such as chloroacetic acid, trichloroacetic acid, trifluoroacetic acid, p-toluene sulfonic acid, methane sulfonic acid, sulfuric acid, phosphoric acid and condensates thereof; and cation acids such as boron trifluoride, tin dichloride, iron(III) chloride and the like. A catalyst is generally used in a quantity of from about 0.001 to about 10% by weight, preferably from about 0.01 to about 2% by weight.

To complete the reaction, it may be advantageous to remove the water formed during the reaction from the reaction mixture by, for example, distillation.

Suitable 1,3-dicarbonyl compounds include: 1,3-diketones such as pentane-2,4-dione and dimedone; and β-ketocarboxylic acid derivatives such as the esterification products of acetoacetic acid with monoalcohols, diols or polyols such as methanol, ethanol, propanol, butanol, ethanediol, propane-1,2-diol, butane-1,4-diol, hexane-1,6-diol, glycerol, trimethylol propane, trimethyol ethane or pentaerythritol. The esterification products of acetoacetic acid with monoalcohols and diols are particularly preferred.

Having thus described our invention, the following examples are given as being illustrative thereof. All parts and percentages given in these examples are parts by weight and percentages by weight, unless otherwise indicated.

EXAMPLES

The terms listed below have the following meaning in the examples given below:

| | |
|---|---|
| OH-V means hydroxyl value | [mg KOH/g]; |
| NH-V means amine value | [mg KOH/g]; |
| A-V means acid value | [mg KOH/g]. |

The materials used in the examples which follow were:

Polyurethane Urea A1

Granules having a maximum particle size of 8 mm of glass-fiber-reinforced polyurethane urea, density 1.26 g/cm$^3$, produced in accordance with Example 2 of German Patentschrift 2 622 951.

Glycolyzate GI 2.4 kg of diethylene glycol were introduced into a 20 liter pot reactor equipped with a stirrer and heating jacket and, after blanketing with nitrogen, were preheated to 220° C. 12 kg of Polyurethane urea A1 were introduced in portions into the hot glycol in a nitrogen atmosphere. The addition was gauged in such a way that the mixture was always stirrable. After a reaction time of 9 hrs., a liquid product having the following properties was obtained:

OH-V=180 mg KOH/g
NH-V=82 mg KOH/g
A-V=0.04 mg KOH/g
Sterically hindered primary aromatic diamine: 3.78% by weight
Sterically unhindered primary aromatic diamine: 3.80% by weight Glycolyzate GII 8 kg of dipropylene glycol and 4 kg of polyurethane urea A1 were initially introduced into a 20 liter pot reactor equipped with a stirrer and heating jacket and blanketed with nitrogen. The mixture was stirred for 2 hrs. at 200° C. and then diluted with 4 kg of a polyether polyol (Desmophen® 3973, a product of BAYER AG, OH-V=28). 7 kg of dipropylene glycol were then distilled off under reduced pressure. A liquid product having the following properties was obtained:

OH-V=172 mg KOH/g
NH-V=45 mg KOH/g
A-V=0.03 mg KOH/g
Sterically hindered primary aromatic diamine: 1.41% by weight
Sterically unhindered primary aromatic diamine: 1.66% by weight Butane-1,4-diol Diacetoacetate Comp. I 650 g of ethyl acetoacetate and 225 g of butane-1,4-diol were stirred at 140° C. in a 1 liter four-necked flask with a distillation bridge. After 8 hrs. at 140° C., 225 g of ethanol had distilled over. A thin colorless liquid was obtained.

Example 1

12.4 kg of GLYCOLYZATE II and 1290 g of COMP I (butane-1,4-diol diacetoacetate) were introduced into a 20 liter pot reactor equipped with a stirrer and heating jacket. After addition of 0.05% by weight of methane sulfonic acid, the mixture was stirred for 24 hrs. at 90° C. The product obtained was liquid at room temperature and had the following properties:

OH-V=158 mg KOH/g
NH-V=37 mg KOH/g
A-V=0.27 mg KOH/g
Sterically hindered primary aromatic diamine: 0.75% by weight
Sterically unhindered primary aromatic diamine: 0.16% by weight

Example 2

13.2 kg of Glycolyzate I and 3065 g of butane-1,4-diol diacetoacetate were introduced into a 20 liter pot reactor equipped with a stirrer and heating jacket. After addition of 0.05% by weight of methane sulfonic acid, the mixture was stirred for 12 hrs. at 95° C. The product obtained was liquid at room temperature and had the following properties:

OH-V=162 mg KOH/g
NH-V=74 mg KOH/g
A-V=0.35 mg KOH/g
Sterically hindered primary aromatic diamine: 0.45% by weight
Sterically unhindered primary aromatic diamine: 0.16% by weight

Example 3

14.5 kg of Glycolyzate II and 2.55 kg of ethyl acetoacetate were introduced into a 20 liter pot reactor equipped with a stirrer and heating jacket. After addition of 0.02% by weight of methane sulfonic acid, the mixture was stirred for 12 hrs at 90 to 100° C. Another 0.9 kg of ethyl acetoacetate were added. The reaction mixture was then stirred for another 6 hrs. at 90° C. in a light vacuum. The product obtained was liquid at room temperature and had the following properties:

OH-V=160 mg KOH/g
NH-V=59 mg KOH/g
A-V=0.31 mg KOH/g
Sterically hindered primary aromatic diamine: 0.15% by weight
Sterically unhindered primary aromatic diamine: <0.1% by weight

Example 4

2.5 kg of Glycolyzate I were introduced at 30° C. into a 3.6 liter plane-ground pot reactor equipped with a stirrer and heating jacket, followed by the dropwise addition of 490 g of dimethyl dicarbonate over a period of 90 minutes. After another 90 minutes and the removal of methanol by distillation, a viscous product having the following properties was obtained:

OH-V=155 mg KOH/g
NH-V=12 mg KOH/g
A-V=0.06 mg KOH/g
Sterically hindered primary aromatic diamine: 0.17% by weight
Sterically unhindered primary aromatic diamine: <0.03% by weight

Example 5

16 kg of Glcolyzate II were blanketed with nitrogen and stirred at 140° C. in a 20 liter pot reactor equipped with a stirrer and heating jacket. The content of fresh sterically unhindered aromatic diamine was determined as follows by HPLC after the times indicated in the following Table:

| After-reaction time | Diamine content |
| --- | --- |
| 0 hours | 1.66% by weight |
| 1 hour | 1.59% by weight |
| 2 hours | 1.50% by weight |
| 4 hours | 1.39% by weight |
| 6 hours | 1.23% by weight |
| 8 hours | 1.04% by weight |
| 10 hours | 0.93% by weight |
| 12 hours | 0.77% by weight |
| 14 hours | 0.64% by weight |

| After-reaction time | Diamine content |
| --- | --- |
| 16 hours | 0.50% by weight |
| 20 hours | 0.36% by weight |

Example 6

820 kg of dipropylene glycol and 400 kg of polyurethane urea A1 were introduced into a 1300 l tank reactor. After heating to approx. 140° C., approx. 15 kg of a mixture made up of water and dipropylene glycol (the water component was dependent on the moisture content of A1 and amounted to between about 30 and 40% by weight) were distilled off over a period of approx. 30 minutes under a pressure of 100 mbar.

The mixture was blanketed with nitrogen and stirred for about 4 hrs. at 210° C. 640 kg of dipropylene glycol were then distilled off (150° C./10 mbar). After cooling to 100° C., the reaction mixture was diluted by addition of 340 kg of a polyether polyol (Desmophen® 3973, Bayer AG; OH value 28) and a liquid product having the following properties was obtained:

OH-V=180 mg KOH/g
NH-V=30 mg KOH/g
A-V=0.02 mg KOH/g
Sterically hindered primary aromatic diamine: 0.5% by weight
Sterically unhindered primary aromatic diamine: 0.55% by weight Although the invention has been described in detail in the foregoing of the purpose of illustration, it is to be understood that such detail is solely for that purpose and that variations can be made therein by those skilled in the art without departing from the spirit and scope of the invention except as it may be limited by the claims.

What is claimed is:

1. A process for the production of hydroxyfunctional compounds suitable for use in the polyisocyanate polyaddition process from polyurethane and/or polyurethane polyurea waste comprising:

I. reacting a polyurethane and/or polyurethane polyurea waste with a low molecular weight diol and/or polyol at a temperature of from about 160 to about 260° C. and II. further reacting the amine-containing alcoholysis products obtained in I. with a dialkyl dicarbonate and/or 1,3-dicarbonyl compound.

2. The process of claim 1 in which a high molecular weight polyol is included in the reaction mixture in step I.

3. The process of claim 1 in which a total of from about 0.3 to about 5 equivalents of dialkyl carbonate and/or 1,3-dicarbonyl compound per equivalent of amine are used.

4. The process of claim 3 in which the reaction in step II is carried out with a dialkyl dicarbonate at a temperature of from about 0 to about 100° C.

5. The process of claim 3 in which the reaction in step II is carried out with a dialkyl carbonate at a temperature of from about 20 to about 70° C.

6. The process of claim 1 in which the reaction in step II is carried out with a dialkyl carbonate at a temperature of from about 0 to about 100° C.

7. The process of claim 1 in which the reaction in step II is carried out with a dialkyl carbonate at a temperature of from about 20 to about 70° C.

8. The process of claim 1 in which the reaction in step II is carried out with dimethyl and/or diethyl dicarbonate.

9. The process of claim 1 in which the reaction in step II is carried out with a 1,3-dicarbonyl compound at a temperature of from about 40 to about 160° C.

10. The process of claim 1 in which the reaction in step II is carried out with a 1,3-dicarbonyl compound at a temperature of from about 60 to about 140° C.

11. The process of claim 1 in which the reaction in step II is carried out with 1,3-dicarbonyl compounds in the presence of a catalytically active quantity of proton acid.

12. The process of claim 11 in which an esterification product of acetoacetic acid with a $C_{1-6}$ monoalcohol and/or diol is used as the 1,3-dicarbonyl compound.

13. The process of claim 10 in which an esterification product of acetoacetic acid with a $C_{1-6}$ monoalcohol and/or diol is used as the 1,3-dicarbonyl compound.

14. The process of claim 9 in which an esterification product of acetoacetic acid with a $C_{1-6}$ monoalcohol and/or diol is used as the 1,3-dicarbonyl compound.

15. A process for the production of a polyisocyanate addition product comprising reacting the polyhydroxyl compound of claim 1 with a polyisocyanate.

* * * * *